March 25, 1958     E. E. MELVIN     2,827,931
FREEZER BOX HOLDER AND FUNNEL
Filed Jan. 4, 1954

INVENTOR
EUGENE E. MELVIN
BY Gustave Miller
ATTORNEY

United States Patent Office 2,827,931
Patented Mar. 25, 1958

2,827,931

FREEZER BOX HOLDER AND FUNNEL

Eugene E. Melvin, Coos Bay, Oreg., assignor to Gustave Miller, Washington, D. C.

Application January 4, 1954, Serial No. 402,047

2 Claims. (Cl. 141—331)

This invention relates to a freezer box holder and funnel for facilitating the filling of a freezer box of the type usually used with home freezers, although the invention is equally applicable for use in commercial filling of freezer boxes for the same purpose.

A further object of this invention is to provide a freezer box holder for conveniently holding the freezer box in a substantially stable position and a flared-mounted funnel to be inserted in the freezer box, so that the freezer box can be readily filled with a minimum of effort while in stable upright position.

Still a further object of this invention is to provide a freezer box holder having a laterally extending platform enhancing the stability of the holder and practically eliminating the possibility of the holder and the container box being accidentally knocked over while in the filling process.

Still a further object of this invention is to provide a freezer box holder having a flaring platform providing stability and wherein the entire device may be made of a heavy molded plastic, such as molded rubber, thus providing a stable holder which will not only be stable against being accidentally over-turned, but which will tend to remain in position and not accidentally slide around during the filling process.

Additionally, this invention comprises a holder which is complementary to the shape of the freezer box, so that the freezer box can be inserted therein, preferably so as to extend somewhat above the top of the holder, with the holder having a laterally extending platform or base at the bottom thereof, so as to insure against the holder being accidentally turned over.

To make the holder still more stable, it will be made preferably of a heavy molded plastic, such as molded rubber, and which still has the further advantage that the molded rubber will tend to hold it against accidental sliding over a supporting surface.

The freezer box is placed in and supported by the holder and then a flared-mouthed funnel having its outside complementary to the inside shape of the box is placed in the box and supported thereon by the flared-mouth, so that the food may easily and readily be poured into the box to the proper amount, and then the funnel is removed, and next, the box is removed and closed in the usual manner, and another box may be easily and quickly substituted therefor, to continue the process of filling the food into as many boxes as needed.

With the foregoing and other objects in view, this invention comprises the combination, construction and arrangement of parts hereinafter set forth, claimed and disclosed in the accompanying drawings, wherein:

Figure 1:
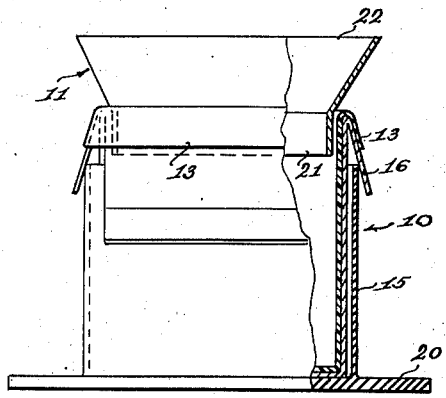
Fig. 1 is a side elevational view of the freezer box, holder, and funnel in operative position, partly broken away.
Figure 2:
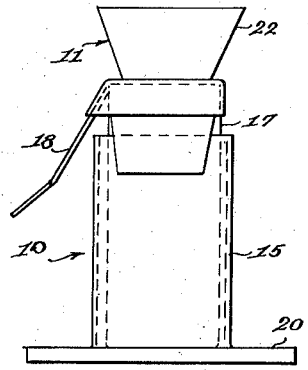
Fig. 2 is an end side elevational view of Fig. 1.
Figure 3:
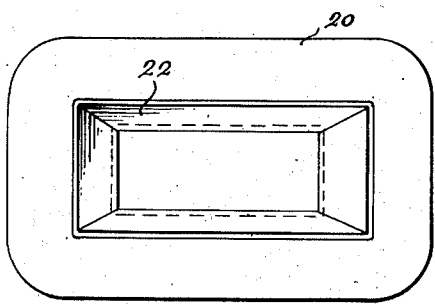
Fig. 3 is a top plan view of Fig. 1.
Figure 5:
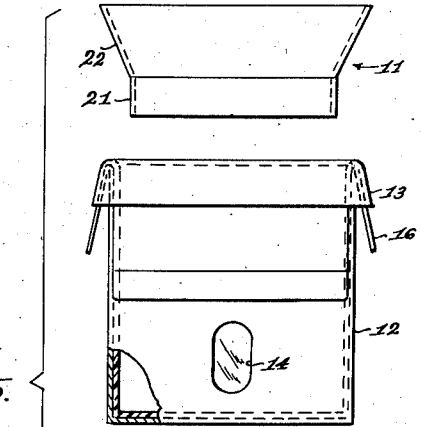
Fig. 5 is an exploded view of the funnel, the freezer box, partly broken away, and the holder.
Figure 4:
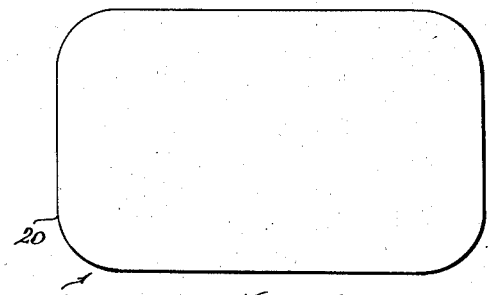
Fig. 4 is a bottom plan view of the holder of Fig. 1.

There is shown at 10 the freezer box holder of this invention and at 11 the cooperating funnel, both for use in holding and filling a freezer box, such as shown at 12, which may be provided with the usual plastic freezer bag 13, the box 12 being provided with the usual window 14, for observing the bag 13 when necessary.

The box 12 and freezer bag 13 are of conventional construction, and the box 12 is usually, although not necessarily, rectangular in plane view. The holder 10 will preferably be made of a heavy molded plastic, such as molded rubber, and is shaped complementary to the outside of the particular freezer box 12, for which it is intended to be used. Obviously when the freezer box 12 is rectangular in plan view, as herein shown, the holder 10 is likewise rectangular in plan view, but should the box 12 be square or circular in plan view, the holder 10 would be similarly shaped in plan view. However, most freezer boxes 12 are rectangular in plan view in order to facilitate packing in the freezer with a minimum waste of space. The holder 10 has a receptacle portion 15 internally shaped, complementary to the shape of the freezer box 12, and of slightly greater dimensions, so that the box 12 may be inserted and removed without difficulty, the dimensions of the receptacle 15 relative to the box 12 being such that it will be an easy fit even though the freezer bag 13 overlapped on the sides of the box may extend into receptacle 15, as may also freezer box lid portions 16 and 17, the freezer box cover 18 extending in or out of the receptacle 15, at the convenience of the operator.

Extending laterally from the bottom of the receptacle portion 15 of the holder 10 is a stabilizing platform 20, preferably molded of the same material at the same time, but of substantial thickness as shown compared to the thickness of the sides of the receptacle portion 15, thus providing great stability to the holder 10. In addition, when the holder 10 is made of rubber, it will tend to stick to whatever surface it is supported on, thus preventing sliding of the box during the filling operation and thus greatly facilitating the operation.

After the box 12, with the freezer bag 13 in position, is inserted in the receptacle portion 15 of holder 10, a funnel 11 is inserted in the open mouth of the freezer bag 13 within box 12, the funnel 11 having a spout 21 shaped complementary to the inside of the freezer box 12, but of such smaller dimension that it will readily fit therein, and integrally extending from the spout 21 is a flared-mouth 22, the dimensions of the mouth 22 being so much greater than the dimensions of the open mouth of the box 12, that the funnel 11 would readily support itself on the mouth of the box 12 and freezer bag 13.

Although the freezer boxes 12 are usually rectangular in cross section in both directions, the receptacle portion 15 of the holder 10 may be slightly tapered from top to bottom, particularly in order to facilitate its manufacure and removal from a mold, particularly if the mold is of the one-piece type, although when the mold is made of several pieces, the receptacle portion may be kept exactly rectangular, if desired.

The funnel 11 may be made of the same plastic or rubber as the holder 10 with its receptacle 15 and heavy base platform 20, although obviously a different type of plastic may be used for the funnel 11, if desired, than that used for the holder 10. Preferably, if plastic is used, a type of plastic will be used that is inert to food and food acids, in view of the fact that the food is poured through the funnel and contacts therewith as it enters the freezer box. The holder 10 does not normally contact the food and hence may be made of a different plastic, preferably molded rubber that is heavy in the platform 20, although relatively thin in the sides of the receptacle portion 15.

While the device has been shown and the structure described in detail, it is obvious that this invention is not to be considered as being limited to the exact form disclosed, and that changes in detail and construction may be made therein within the scope of what is claimed, without departing from the spirit of this invention.

Having thus set forth and disclosed the nature of this invention, what is claimed is:

1. A readily portable filler device comprising a filling funnel and a base therefor for holding a container in position while it is being filled, said base comprising a container holding member having side walls extending vertically and integrally from a bottom floor, said bottom floor extending substantially beyond said vertical side walls and said bottom floor being of a thickness and weight substantially in excess of that of said side walls thereby providing a self-stabilizing and integral platform for supporting said base on any suitable supporting surface, said vertical side walls being rectangularly spaced to one another, said bottom floor within said side walls being arranged to support the bottom of the container to be filled, said side walls having their inner faces complementary to the greater portion of the outer vertical sides of the container to be filled, and said filling funnel having upper funnel walls, rectangular to one another, flared inwardly and downwardly from a size greater than the rectangle formed by said vertical side walls to a size complementary to the inner sides of the container to be filled, and short downwardly extending funnel walls extending from the bottom of said flared funnel walls, said downwardly extending funnel walls beig complemetary to the inner faces of the container vertical walls.

2. The container filler of claim 1, said stabilizing form being of molded rubber to increase its frictional contact on a supporting surface.

References Cited in the file of this patent
UNITED STATES PATENTS

| | | |
|---|---|---|
| Re. 23,504 | Carter | May 27, 1952 |
| 435,638 | Barnes | Sept. 2, 1890 |
| 479,151 | Menze | July 19, 1892 |
| 860,081 | Converse | July 16, 1907 |
| 1,107,114 | Rose | Aug. 11, 1914 |
| 1,146,199 | Mostizer | July 13, 1915 |
| 1,389,594 | Moore | Sept. 6, 1921 |
| 1,635,844 | Hoffman | July 12, 1927 |
| 2,168,395 | Damkroger | Aug. 8, 1939 |
| 2,503,525 | Sutherland | Apr. 11, 1950 |
| 2,688,429 | Davison | Sept. 7, 1954 |